June 10, 1924.
W. W. STEAD
1,497,126
CONFECTIONERY APPARATUS
Filed Sept. 8, 1923   2 Sheets-Sheet 1
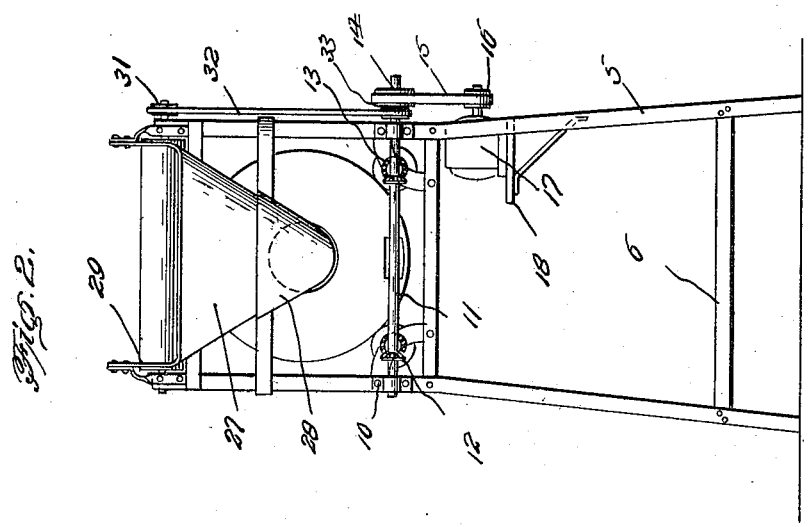
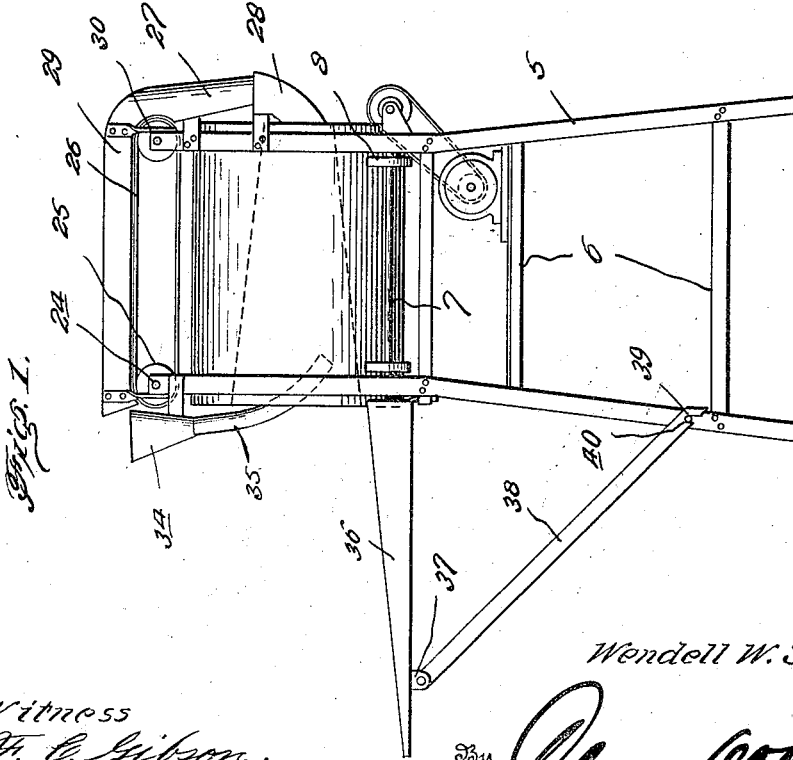
Witness
F. C. Gibson.
Inventor
Wendell W. Stead.
By
Attorney June 10, 1924. 1,497,126

W. W. STEAD

CONFECTIONERY APPARATUS

Filed Sept. 8, 1923 2 Sheets-Sheet 2

Inventor
Wendell W. Stead.

Witness.
F. C. Gibson.

By
Attorney

Patented June 10, 1924.

1,497,126

UNITED STATES PATENT OFFICE.

WENDELL W. STEAD, OF ROCHESTER, NEW YORK.

CONFECTIONERY APPARATUS.

Application filed September 8, 1923. Serial No. 661,715.

*To all whom it may concern:*

Be it known that I, WENDELL WILLIAM STEAD, a citizen of the United States, residing at Rochester, in the county of Monroe and State of New York, have invented certain new and useful Improvements in Confectionery Apparatus, of which the following is a specification.

In carrying out the present invention it is my purpose to provide an apparatus that is primarily adapted to be employed in the confectionery art and specifically for the applying of powdered sugar or other powdered substance to the surface of cakes, doughnuts, etc.

The primary object of my invention resides in the provision of such an apparatus that is extremely simple in construction and one that may be installed and operated at minimum expenditure, the device comprising essentially a rotary drum or barrel in which are disposed the cakes or doughnuts to be powdered together with means for supplying the powdered material to the drum whereby this powder is applied to the articles during the rotation of the drum.

A still further object of my invention is to provide such a machine wherein articles of confectionery may be powdered in a novel, simple and expeditious manner and in large quantities which will be a substantial saving in time and labor it being now the usual practice to coat these articles of confectionery with a powdered substance, by hand.

With the above and other objects in view as the nature of the invention is better understood, my novel apparatus comprises the form, combination and arrangement of parts set forth in the following detailed specification, shown in the accompanying drawings and claimed.

Figure 3:
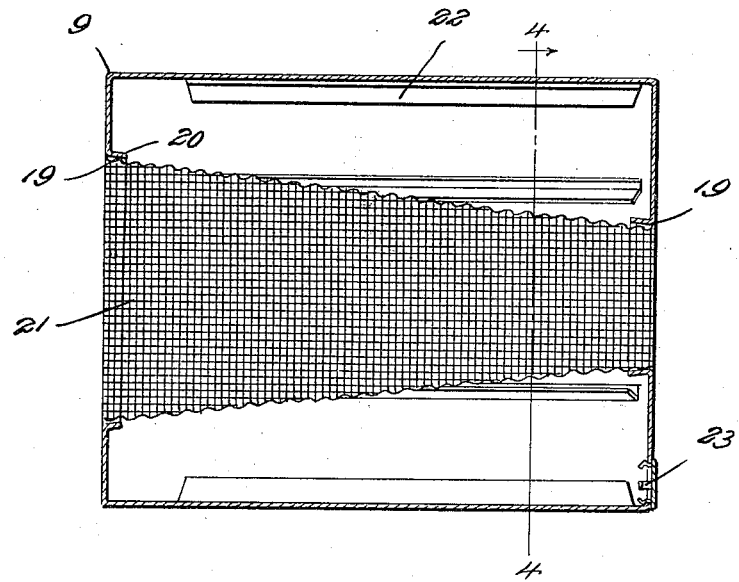
Figure 4:
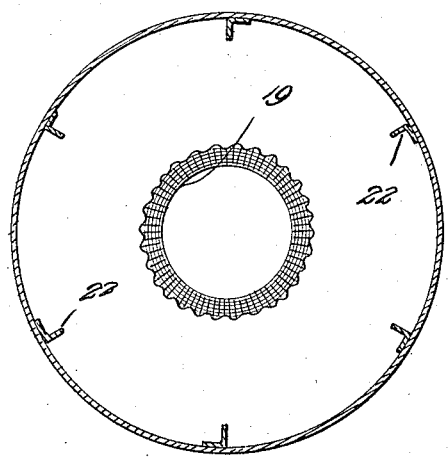

In the drawings wherein like reference characters indicate corresponding parts throughout the several views, Figure 1 is a side elevational view of my improved apparatus, Figure 2 is an end elevational view thereof, Figure 3 is an enlarged detail cross section of the powdering drum per se, and Figure 4 is a transverse cross section taken substantially upon the line 4—4 of Figure 3, looking toward the right as shown by the arrows in Figure 3.

Now having particular reference to the drawings, my novel apparatus embodies a supporting frame that comprises four corner standards 5 that are inter-connected through the medium of a desirable number of brace bars 6, the lower ends of these standards 5 converging outwardly as clearly shown in Figures 1 and 2 for obvious purposes. Journaled at their opposite ends in longitudinally alined standards 5 are parallel shafts 7 each of which carries at its opposite ends rollers 8 upon which is supported a relatively elongated drum-shaped container 9. Extending transversely of the supporting frame at the rear side thereof and journaled at its opposite ends in bearings 10 upon the rearmost standards 5 is a shaft 11, which shaft is equipped inwardly of its ends with beveled gears 12 which beveled gears have mesh with other beveled gears 13 carried by the adjacent ends of the before mentioned shaft 7. This last mentioned shaft 7 extends outwardly of one side of the apparatus frame and is equipped with a belt pulley 14 over which is arranged an endless belt 15, this belt extending downwardly and inwardly and being in turn trained over a relatively smaller pulley 16 upon the end of the armature shaft of an electric motor 17, which motor is supported upon a shelf 18 carried between longitudinally alined ones of the said supporting frame standards 5.

As more clearly shown in Figure 3 the before mentioned drum-shaped container 9 is provided at its opposite end walls with different sized central circular openings 19 surrounding which are inwardly extending flanges 20 and within which are arranged the opposite ends of a conical open-ended screen 21. Arranged within said drum-shaped element 9 are longitudinal ribs 22 that may be and preferably are in the form of L-irons, Figure 4. These ribs 22 terminate at their forward ends inwardly of the front end of said drum shaped receptacle 9 as clearly shown in Figure 3. Arranged within an opening in the rear wall of the member 9 is a removable closure cap 23 for allowing the powdered sugar or other material to be removed when desirable.

Journaled between transversely alined standards 5 of the apparatus frame are shafts 24 that are equipped with rollers 25 and over which is extended an endless belt 26, the rear end of this endless belt having communication with the upper flared end of a material conveying spout 27, that has communication at its lower end with an inwardly curved spout 28 suitably secured to the apparatus frame and extending within the smaller end of the said conical-shaped screen 21. The upper open end of said spout 27 is provided with forwardly extending guide ribs 29 upon opposite sides of said endless belt 26, these ribs being secured in position through the medium of straps 30 that are carried by the upper ends of said standards 5.

The rearmost roller carrying shaft 24 is equipped with a pulley 31 over which is trained an endless belt 32 that extends downwardly as shown in Figure 2 and is in turn trained over another pulley 33 upon the before mentioned transverse shaft 11 and preferably inwardly of the pulley 14 that is also carried by this shaft.

Upon the front side of the apparatus frame and secured thereto in any manner desirable is a hopper 34 that is equipped with a spraying tube 35 that extends downwardly and enters the enlarged end of the before mentioned conical screen 21.

Hingedly supported upon the front end of the apparatus frame is a material receiving platform 36 that communicates at its rear end with the front end of said drum-shaped receptacle 9, the under side of this platform being formed adjacent its front end with pendant ears 37 to which are pivotally secured the upper ends of relatively elongated links 38 the lower ends of which are notched as at 39 and adapted for engagement over pins 40 upon the front pair of standards 5 whereby said platform 36 is supported in the position shown in Figure 1 for receiving the doughnuts or cakes that discharge from the enlarged end of said conical-shaped screen 21.

In view of the above description it will at once be apparent that sugar or other powdered substance may be placed within the hopper 34 which will discharge onto the screen 21 and thence within said receptacle 9. During the rotation of the drum-shaped receptacle 9 doughnuts or cakes are placed upon the endless conveyer 26 and are carried rearwardly into the upper flared end of the hopper 29 and thence through the conveying tube 28 onto the smaller end of the screen 21. The rotation of this receptacle 9 will obviously cause the movement of the doughnuts or cakes forwardly and at the same time turning the same over. The ribs 22 will manifestly catch the sugar or other powdered substance and raise the same to substantially the top of the machine after which it will be dumped onto the screen 21 and through this screen onto the doughnuts or cakes for thoroughly powdering the same, the surplus sugar or powdered substance will move to the forward ends of these ribs 22 and will not be carried around during the rotation of the receptacle, which material may be removed through the opening in the rear wall of said receptacle by removing the cap 23 from this opening.

In view of the above it will at once be apparent to those skilled in the art, that I have provided a highly novel and simplified form of confectionery apparatus and one that may be conveniently used for the powdering or sugaring of doughnuts, cakes and the like.

Even though I have herein set forth the most practical embodiment of this invention with which I am at the present time familiar, it is nevertheless to be understood that minor changes may be made within the invention without departing from the spirit and scope of the appended claims.

Having thus described my invention, what I claim as new and desire to secure by Letters Patent is:—

1. In a confectionery apparatus of the class described, a supporting frame, a drum-shaped receptacle supported for rotation within the upper end of said frame and being formed at its opposite ends with different sized openings, a conical-shaped screen fitted at its opposite ends within said openings, means for rotating said receptacle, means for delivering a supply of powdered material to the front end of said screen, and means for delivering a supply of doughnuts or the like to the rear end of said screen.

2. In a confectionery apparatus of the class described, a supporting frame, a drum-shaped receptacle supported for rotation within the upper end of said frame and being formed at its opposite ends with different sized openings, a conical-shaped screen fitted at its opposite ends within said openings, means for rotating said receptacle, means for delivering a supply of powdered material to the front end of said screen, means for delivering a supply of doughnuts or the like to the rear end of said screen, said last mentioned means comprising an endless conveyer upon the upper end of the frame and having communication at its rear end with a spout that communicates in turn with the rear end of said screen.

3. In a confectionery apparatus of the class described, a supporting frame, a drum-shaped receptacle supported for rotation within the upper end of said frame and being formed at its opposite ends with different sized openings, a conical-shaped screen fitted at its opposite ends within said openings, means for rotating said receptacle, means for delivering a supply of powdered material to the front end of said screen, means for delivering a supply of doughnuts or the like to the rear end of said screen, said last mentioned means comprising an endless conveyer upon the upper end of the frame and having communication at its rear end with a spout that communicates in turn with the rear end of said screen, and means for actuating said endless belt simultaneously with the rotation of said receptacle.

In testimony whereof I affix my signature.

WENDELL W. STEAD.